(12) United States Patent
Slivar (10) Patent No.: US 8,835,040 B2
(45) Date of Patent: Sep. 16, 2014

(54) SEPARATOR FOR CYLINDRICAL CELLS

(71) Applicant: Hibar Systems, Ltd., Richmond Hills (CA)

(72) Inventor: Djuro Slivar, Ontario (CA)

(73) Assignee: Hibar Systems, Ltd., Richmond Hills, Ontario (CA)

( * ) Notice: Subject to any disclaimer, the term of this patent is extended or adjusted under 35 U.S.C. 154(b) by 0 days.

(21) Appl. No.: 13/739,630

(22) Filed: Jan. 11, 2013

(65) Prior Publication Data

US 2013/0118005 A1 May 16, 2013

Related U.S. Application Data (62) Division of application No. 10/578,149, filed as application No. PCT/IB03/05023 on Nov. 5, 2003, now Pat. No. 8,389,148.

(51) Int. Cl.
  *H01M 2/14* (2006.01)
  *H01M 2/18* (2006.01)
  *H01M 10/28* (2006.01)
  *H01M 2/16* (2006.01)

(52) U.S. Cl.
  CPC ............... *H01M 2/145* (2013.01); *H01M 2/18* (2013.01); *H01M 10/283* (2013.01); *H01M 2/1666* (2013.01); *H01M 2/14* (2013.01); *Y02E 60/124* (2013.01); *H01M 2/162* (2013.01); *H01M 2/1653* (2013.01); *H01M 2/1686* (2013.01)
  USPC ........... 429/141; 429/129; 429/131; 429/132; 429/134; 29/623.1; 29/730; 29/731; 264/544; 264/545; 264/547; 264/548; 493/269; 493/304; 493/305; 493/308

(58) Field of Classification Search
  CPC ........ H01M 2/14; H01M 2/1686; H01M 2/18
  USPC .......................... 429/129, 131, 132, 134, 141; 29/623.1–623.5, 730, 731; 264/544, 264/545, 547, 548; 493/269, 304, 305, 308
  See application file for complete search history.

(56) References Cited

U.S. PATENT DOCUMENTS 3,795,964 A * 3/1974 Beckman ........................ 493/304
4,565,002 A * 1/1986 Matsuo et al. ............... 29/623.4

(Continued)

FOREIGN PATENT DOCUMENTS

| JP | 58-082465 | * | 5/1983 | ............. H01M 2/16 |
| JP | 58-82465 A |  | 5/1983 |  |

(Continued)

*Primary Examiner* — Ula C Ruddock
*Assistant Examiner* — Amanda Barrow
(74) *Attorney, Agent, or Firm* — Fitch, Even, Tabin & Flannery LLP (57) ABSTRACT

Separator for cylindrical cell of the outwardly guided type, wherein a sheet material is wound around a mandrel, and starting from the winding step until the insertion of a separator into the cell, an outward support is used that renders the binding of neighboring turns of the separator winding unnecessary, and the separator sheet has an extended portion, with the extension being at least equal to the radius of the separator cylinder, and with this extended portion being wetted with distilled or de-ionized water until the material softens and the winding and the mandrel are rotated and the bottom part is folded back and heat fused to close the separator cylinder.

10 Claims, 6 Drawing Sheets

(56) References Cited

U.S. PATENT DOCUMENTS

| | | | |
|---|---|---|---|
| 4,642,083 A * | 2/1987 | Hinzmann | 493/93 |
| 4,669,183 A | 6/1987 | Duncan et al. | |
| 5,197,995 A * | 3/1993 | Lowton et al. | 29/623.2 |
| 5,208,120 A * | 5/1993 | Winger | 429/133 |
| 5,626,988 A * | 5/1997 | Daniel-Ivad et al. | 429/229 |
| 6,035,518 A * | 3/2000 | Slivar | 29/592.1 |
| 6,099,987 A | 8/2000 | Daniel-Ivad et al. | |
| 6,177,210 B1 * | 1/2001 | Lonsberry | 429/133 |
| 6,270,833 B1 * | 8/2001 | Yamashita et al. | 427/58 |
| 6,475,666 B1 | 11/2002 | Takeuchi | |
| 6,541,152 B1 * | 4/2003 | Shoji et al. | 429/142 |
| 2003/0082443 A1 * | 5/2003 | Janmey | 429/142 |

FOREIGN PATENT DOCUMENTS

| | | |
|---|---|---|
| JP | 07-245091 A | 9/1995 |
| WO | 2005/045955 A1 | 5/2005 |

* cited by examiner

SEPARATOR FOR CYLINDRICAL CELLS

CROSS-REFERENCE TO RELATED APPLICATIONS

This application is a Divisional Patent Application of U.S. application Ser. No. 10/578,149, filed May 3, 2006, which is the U.S. National Stage (371) application of PCT International Application No. PCT/IB2003/005023 filed Nov. 5, 2003, the complete disclosures of all of the aforesaid applications are incorporated herein by reference.

FIELD OF THE INVENTION

The invention relates to an improved separator for cylindrical cells, preferably for alkaline cells that have a cylindrical body and a closed bottom portion.

BACKGROUND OF THE INVENTION

Cylindrical cells, mostly alkaline cells are widely used. These cells are comprised of an elongated cylinder constituted by a metal can with press fitted cathode pellet rings containing manganese dioxide as the active electrode material in the interior of the can to constitute the positive cell electrode. An anode gel composed of zinc powder active material, gelling agent and an alkaline electrolyte filling the cylindrical central cavity of the positive cell electrode so that a cylindrical separator made of a specific sheet material separates the two electrodes. The separator must be composed of a material that allows ions to pass from one electrode to the other, but prevent particles of the two electrode materials from passing through, and also be an electrical insulator to prevent electrons from passing directly though. The active area of the separator is the portion where it directly separates active cathode material from anode material. A critical portion of the separator is the central bottom part, because the anode gel expands significantly during discharge of the cell and the bottom part has to remain intact separating the anode from the interior of the can, which would cause an internal short circuit and cell failure.

A conventional way of providing a reliable insulation is described in U.S. Pat. No. 6,099,987 wherein an outer and an inner isolating cup are attached to the lower end of the separator, and the interior bottom part of the separator is sealed by the application of a thermoplastic sealant. This is a perfect solution as far as isolation of the two electrodes are concerned but the presence of the cups and of the sealant takes a substantial cell volume, which cannot be utilized for cell function and requires the handling of several separate material parts.

U.S. Pat. No. 6,541,152 shows a different design also utilizing an insulating cup at the bottom and it has the same problem of decreasing useful cell volume and requires the handling of two separate material parts.

U.S. Pat. No. 6,270,833 does not use any cup but the separator is made longer than the required useful length in the cell, the windings of the cylindrical separator body are bound together with a binder, and the extended portion is first pushed inwardly by a tool moving normal to the cylinder axis then folded back to close the initially open end. The folded and closed separator forms a self containing unit that should then be inserted into the cell. The smooth insertion requires a small clearance between the inner diameter of the cathode rings and the separator, which could increase cell resistance. The closing operation of the bottom part is complicated and requires movements in different directions, and problems can arise by the inevitable appearance of wrinkles.

U.S. Pat. No. 6,035,518 describes a different method of making the separator, in which the separator material is wound around a mandrel and the winding is kept on the mandrel by a vacuum, and the separator does not constitute a self-containing unit, it should be guided until insertion into the semi-finished cell, wherein the winding tries to open up and fill the whole available space. While the idea of guiding the separator until insertion into the cell is preferable, the key problem, i.e. the closing of the bottom is solved here by the application of a hot melt sealant to fill the cell bottom including the bottom region of the separator. The presence of a sealant at the active lower region of the separator also decreases the available useful cell volume.

A further problem characteristic to separators used for secondary cells lie in that often a laminated structure should be used, since in case of secondary cells a thin semi permeable membrane layer, such as a cellophane layer should be provided. Two or more layered laminates are expensive and adhesives used to affix the layers contribute to higher internal resistance.

There is a further issue concerning separators that concern the need of synchronization with the general cell manufacturing process. State of the art processes produce at high speeds of 600 to 1200 parts per minute, and this high speed favors or requires easy to use technologies that can fit into the manufacturing line, rather than preparation of off-line, pre-fabricated separators, which can cause problems from additional handling.

OBJECT OF THE INVENTION

The primary object of the invention is to enable maximum utilization of available cell volume. A further object is the combination of the unfolding nature of the guided separator as taught in the above referred U.S. Pat. No. 6,035,518 with the reliable establishment of a closed bottom that does not require the application of a sealant in the useful cell area, or overcoming the disadvantages of the methods described in the cited Japanese publications. Yet another object of the invention is to provide on-line adjustments of the sheet material length without the changes of any hardware components. A different object is to provide a separator that does not require the use of a laminate sheet if a multi-layered structure is required e.g. for secondary cells. A still further object is to provide a method that is simple, easy to make and which can provide synchronization with the cell manufacturing process.

SUMMARY OF THE INVENTION

According to the present invention a guided separator has been provided, wherein a sheet material is wound around a mandrel, and starting from the winding step till the insertion of the separator into the cell, an outward support is used that renders the binding of the neighboring turns of the separator winding unnecessary, and the separator sheet has an extended lower portion, wherein the extension is at least equal to the radius of the separator cylinder, and this extended portion is wetted with distilled or de-ionized water and wetted until the material softens and the winding and the mandrel are rotated and the bottom part is folded back to close the cylinder. The folding step is followed by a heat forming and fusing step, wherein a heated die is pressed against the bottom of the mandrel pressing and heating the folded portion therebetween, which causes the sheet material to fuse together. At this step the separator and the mandrel are not rotated any more.

The bottom sealing can be improved by the application of a predetermined small amount of thermoplastic sealant at the central bottom region that corresponds to an inactive part of the cell to ensure that the bottom seal is free of any potential pinholes.

The insertion of the separator can be facilitated if the mandrel consists of an outer sleeve and an inner pin, wherein the pin has a head portion corresponding to the required shape of the bottom portion of the separator. In that case the pin can hold the separator in place inside the semi-finished cell, while the sleeve is withdrawn first, and after removal of the sleeve the pin can be removed with the risk of pulling back the separator from the semi-finished call.

As a preferable embodiment multiple sheets can be wound together eliminating thereby the need of using an expensive laminate.

The present invention provides a maximum utilization of the available useful cell volume, since the full vertical surface of the separator is active, and there is no need of leaving an unnecessary clearances between the cathode interior and the separator. The non-use of any binder material improves the performance of the separator by decreasing its internal resistance. Last but not least, the wet folding followed by a heat forming step leaves essentially no wrinkles, providing an excellent separator bottom closing, which is easy to carry out.

DESCRIPTION OF THE DRAWINGS

The invention will now be described in connection with preferable embodiments thereof, wherein reference will be made to the accompanying drawings. In the drawing.

DESCRIPTION OF THE PREFERRED EMBODIMENTS

Figure 1:
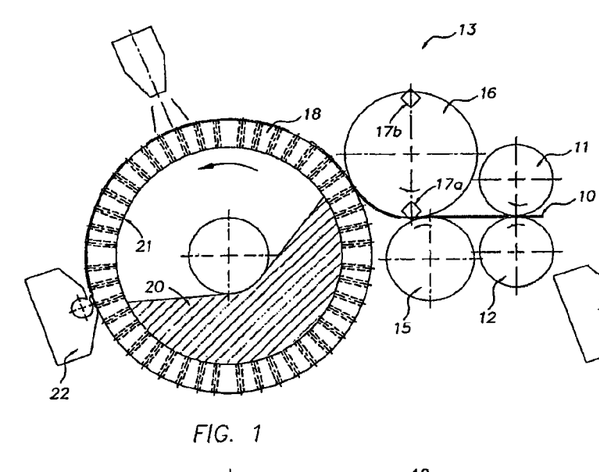
FIG. 1 shows the schematic top view of the sheet feeding station.
Figure 2:
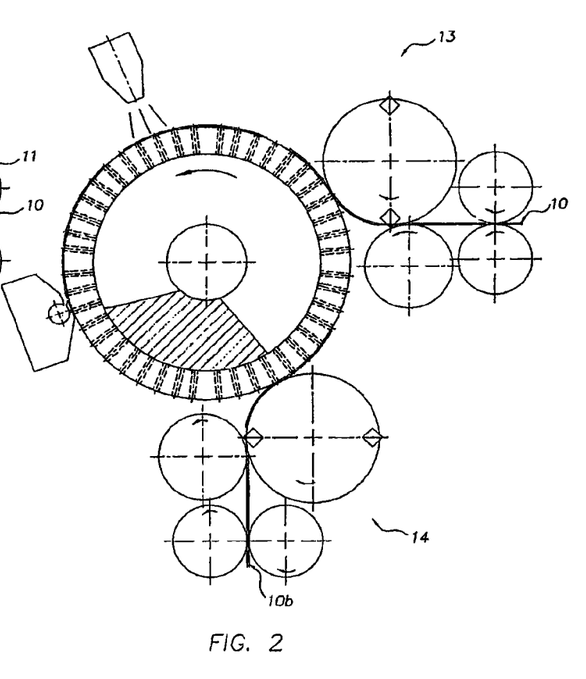
FIG. 2 is a similar view as FIG. 1 adapted for feeding two sheets.

FIGS. 1 and 2 show a similarity with FIG. 1 of U.S. Pat. No. 6,035,518 of Slivar, wherein a separator sheet material 10 is pulled down from a reel (not shown) by means of a pair of feed rollers 11, 12 rotating in opposite directions as shown by the arrows. The sheet material is a fibrous, porous, non-woven paper-like material in case of forming separators for alkaline cells. The sheet material can be a semi permeable membrane, such as a cellophane film, grafted micro-porous polyolefin membrane or the like, which can be laminated to a non-woven sheet material in case of secondary cells.

The path of the sheet material 10 extends between a pair of counter-rotating cutting rollers 15, 16. The roller 15 is a cylinder and acts as an anvil, while the roller 16 is spaced from the path of the sheet 10 and a pair of cutter prisms 17a and 17b with respective cutting edges is attached to the roller 16 at diametrically opposing positions. Twice in each revolution of the rollers 15, 16 one of the cutting edges presses against the anvil, and the sheet material gets cut along the edge. The cutting rollers are geared with the main assembly machine carrying the winding nest 22. The length of the cut sheet section is determined by the speed of feed rollers 11, 12, which are preferably servo-driven to enable on-line adjustments of the sheet length without the changes of any hardware components. The sheet material 10 proceeds in forward direction and reaches the periphery of a vacuum wheel 18 rotating in the direction as indicated by the arrow. These elements together constitute a first sheet feeder assembly 13.

The vacuum wheel 18 has a stationary center 20 with a partially hollow cross section, and a vacuum is provided in the hollow inner space defined between the interior of the wheel 18 and the center 20. A plurality of bores 21 is provided in the wall of the vacuum wheel 18. When the sheet material 10 reaches the periphery of the vacuum wheel 18, the vacuum through the first of the bores 21 will temporarily fasten the material to the wheel 18 by means of the sucking force, and the cut piece of sheet material will be transported till a zone of engagement with a winding nest 22. The winding nest 22 is part of a cell assembly line (not shown) and it moves along a circular path having a diameter much larger than that of the vacuum wheel 18. The cut sheet material 10 will continue in the interior of the winding nest 22, because in the engagement zone of the winding nest 22 and the vacuum wheel 18 the stationary center 20 closes down the path of the vacuum allowing the front portion of the sheet material to be guided away from the vacuum wheel 18 into the winding nest 22, while the remaining portion of the sheet material is still held in place by vacuum. As the separator is wound up in the winding nest 22, a portion of the sheet material is always released from the vacuum wheel until the whole sheet is wound up.

The arrangement of FIG. 2 is similar to that of FIG. 1, the difference lies in the existence of a second sheet feeder assembly 14 placed around the periphery of the vacuum wheel angularly offset from the first sheet feeder assembly 13 in a direction against the sense of rotation. The second feeder assembly 14 is used to provide a second sheet material 10b with predetermined length that will already be attached to the periphery of the vacuum wheel 18 when the first feeder assembly 13 feeds the sheet material. In this way two sections of sheet material 10 and 10b will travel one on top of another towards the winding nest 22. The length of the sections can be equal but also different. In case of different length sheets, the position of the shorter sheet can be in any region of the longer sheet, which results in different positioning of the shorter sheet material inside the finished separator. The use of two or more sheet material sections eliminates the need of using a laminate as sheet material when separators for rechargeable batteries are made, wherein one of the sheet materials can be a semi permeable membrane, such as a cellophane layer.

Figure 1A:
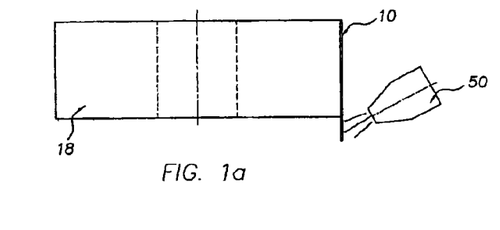
FIG. 1a is the simplified elevation view of a part of FIG. 1.

In the elevation view of FIG. 1a the sheet material 10 extends over the bottom edge of the vacuum wheel 18. The height of the separator to be prepared corresponds substantially to the height of the vacuum wheel 18 and the extending portion will later form the separator bottom. A spray head 50 is used to spray a predetermined amount of distilled or de-ionized water to the extending portion of the sheet material 10 to slightly wet and soften the sheet material. Other means of water application for wetting such as nozzles, belts or others are acceptable as well.

Figure 3:
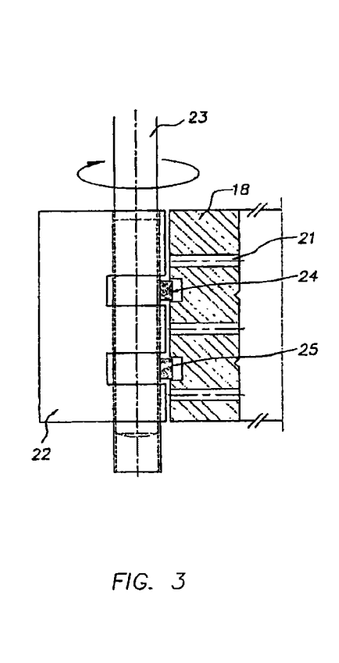
FIG. 3 shows the elevation view of the contact zone of the winding nest and the vacuum wheel, partially in section.
Figure 4:
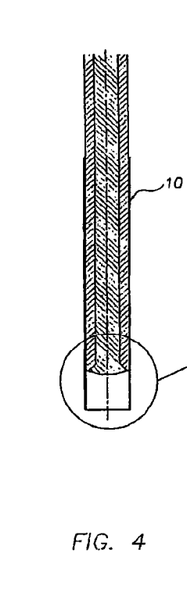
FIGS. 4 and 4a show the sectional elevation view of the two-part mandrel.
Figure 4A:
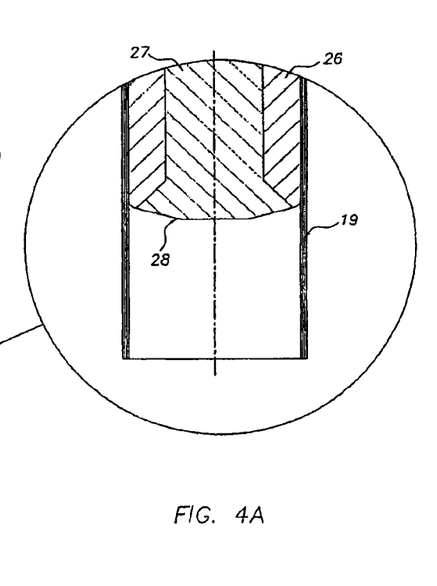

FIG. 3 shows the contact zone of the vacuum wheel 18 and of the winding nest 22. A two-part mandrel 23 is inserted through a central opening of the winding nest 22 and rotated as illustrated by the arrow. The winding nest 22 is not rotated. The peripheral speed of the mandrel 23 is substantially the same or somewhat higher as that of the vacuum wheel 18 and of the speed of a pair of belts 24, 25 made of a resilient material e.g. rubber. The belts 24, 25 are arranged and led through the zone of contact between the vacuum wheel 18 and the winding nest 22 and they are contacting and pressing the sheet material 10 wound around the mandrel 23. The belts 24, 25 contact the sheet material 10 through respective cut sections made in the winding nest 22. The mandrel 23 shown in FIGS. 4 and 4a comprise a sleeve 26 and a pin 27 extending through the central hollow opening of the sleeve 26. The pin 27 has a wider head portion 28 having the shape as shown in FIG. 4A fitted in a nest on the end portion of the sleeve 26. The pin 27 fits loosely in the sleeve 26. Both the pin 27 and the sleeve 26 are rotated and moved together until a predetermined station of the assembly line is reached.

When FIGS. 1 and 3 are considered together, it can bee seen that the sheet material 10 will move in the hollow interior of the winding nest 22, and under the pressing effect of the belts 24, 25 it will be wound around the rotating mandrel 23. The extending wet portion 19 will extend out over the head 28.

The winding nest 22 together with the mandrel 23 and the wound sheet material 10 will then move out from the contact zone with the vacuum wheel, and the belts 24, 25 are led along this path of movement pressing continuously the wound and rotating sheet material 10 to the mandrel 23.

Figure 5:
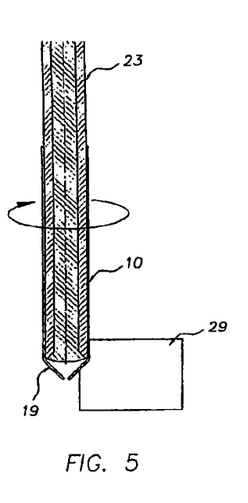
FIGS. 5 to 10 illustrate the folding of the separator bottom part.
Figure 6:
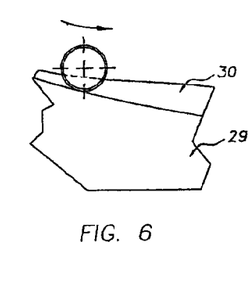
Figure 7:
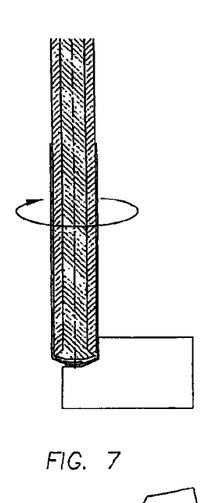
Figure 8:
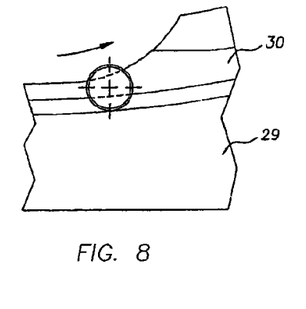
Figures 9, 10:
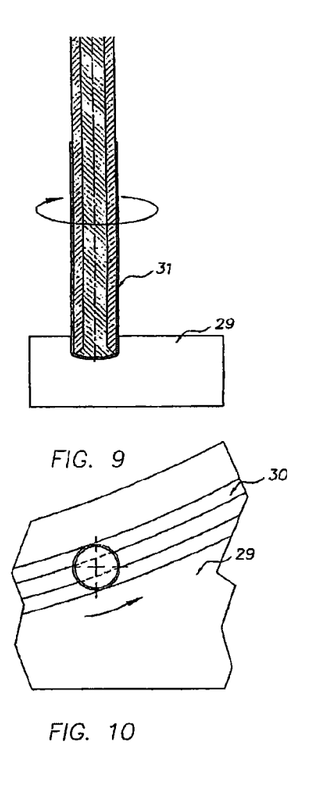

Reference is made to FIGS. 5 to 10 showing the mandrel 23 with the wound sheet 10 around it at three subsequent positions during the path of movement of the assembly in the manufacturing line. The winding nest 22 around the sheet 10 has not been shown, however, it travels together until full insertion of the separator in the battery console. A stationary rail 29 is arranged along the travel path of the assembly. The rail 29 defines a forming groove 30 in which the wet extending portion of the rotating sheet 10 is inserted. FIGS. 5 and 6 show the forming groove 30 close to the initial position of engagement, FIGS. 7 and 8 correspond to a medium position and FIGS. 9 and 10 show the final position just before the assembly moves out of the zone of engagement with the rail 29. The profile of the groove 30 corresponds to that of the head portion of the mandrel 23, whereby the extending wet portion 19 of the sheet material 10 will be gradually formed. The soft sheet material will easily follow the profile of the groove because in wet state it is very flexible and the forming process will occur smoothly leaving essentially no wrinkles. The rotation facilitates a smooth forming operation. The extending portion 19 has a sufficient length that by the end of the forming process the central opening of the wound sheet material 10 gets completely closed, and thereby a separator 31 is produced. Shortly after the assembly moves out of the groove 30 end leaves the end of the rail 29, the assembly leaves the path of the belts 24, 25 and the rotation of the mandrel 23 is stopped.

Figure 11:
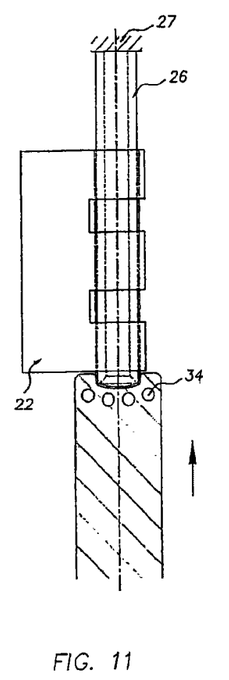
FIGS. 11 and 12 show the forming and pressing step by a heated die.
Figure 12:
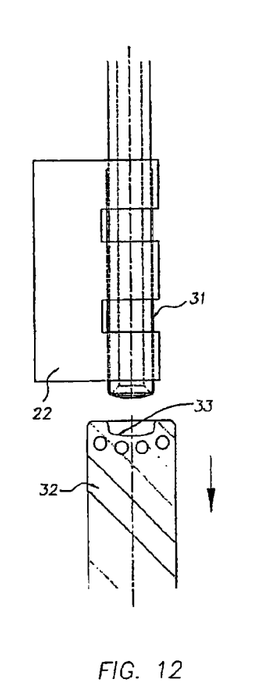

At this time the vertical position of the pin 27 is held in a fixed position, and a heated die 32 with an upwardly facing recess 33 is moved upwards (FIG. 11) and pressed against the lower formed end of the separator 31. The profile of the recess 33 corresponds to that of the head portion 28 of the pin 27, and the pressure arising between the recess 33 and the head portion 28 fuses the separator 31 to take the shape of the head portion 28. The heating is provided by a cartridge heater 34 installed in the interior of the die 32 as illustrated schematically on FIGS. 11 and 12, and the elevated temperature and pressure is sufficient to form and fuse the bottom portion of the sheet material to its final shape. Following this bottom forming and fusing step the so obtained structure will be essentially wrinkle-free and sufficiently strong to keep the lower part of the separator cylinder together.

Figure 15:
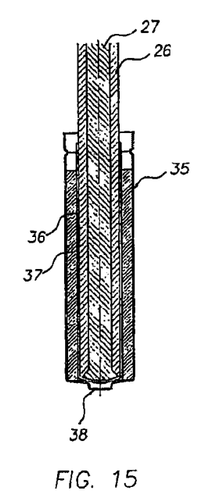
FIGS. 15 to 17 illustrate the insertion of the separator in the cell.
Figure 16:
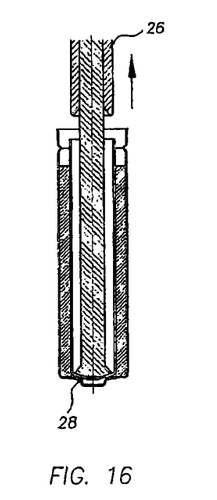
Figure 17:
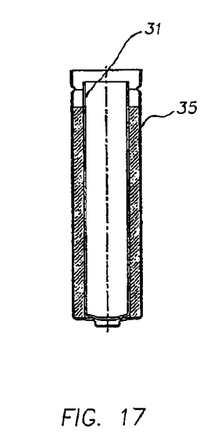

The separator 31 should finally be inserted in the hollow interior of a cylindrical cell console (can/cathode) assembly 35, which is a semi-final intermediate product and has the shape as illustrated in FIGS. 15 to 17. The console 35 comprises a cylindrical metal can 36 defining a cylindrical inner space, in which a plurality of hollow cathode rings 37 are inserted. The closed end portion of the can 36 has a short cylindrical tip 38. The central region of the formed and closed bottom part of the separator 31 is just above the hollow interior space of the tip 38, and this space is sufficient to allow application of a thermoplastic sealant referred also to as "hot melt" at the central bottom part of the separator 31. The presence of this sealant is optional and provides additional short circuit prevention for the closed bottom part of the separator 31.

Figure 13:
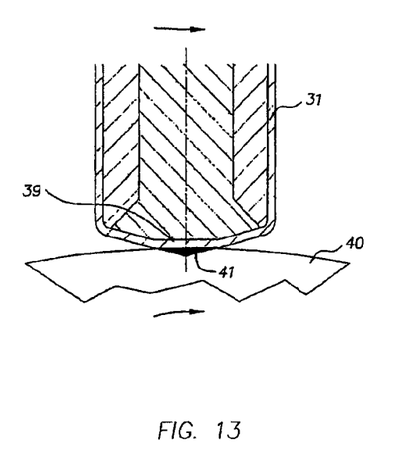
FIGS. 13 and 14 are enlarged sectional views showing the application of a sealant.
Figure 14:
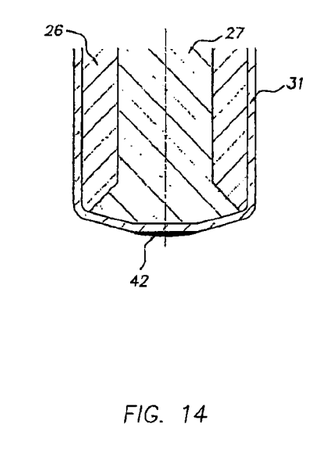

The enlarged view on FIG. 13 illustrates the application of a predetermined amount of hot melt on the central bottom part 39 of the separator 31. A rotating wheel 40 is provided with shallow spherical or conical recesses 41, and the surface of the wheel 40 just contacts or is arranged in the close vicinity of the central bottom part 39 of the separator 31. A predetermined amount of hot melt is measured in the recesses 41, e.g. by immersing the rotating wheel 40 into a heated tank of hot melt along the path of rotation (not shown), and after removal of excess hot melt from the recessed surface of the wheel 40 this latter will move into the position shown in FIG. 13, where the central bottom part 39 of the separator 31 contacts the recess 41. Here the absorbent separator material will take up the volume of hot melt in the recess 41. The wheel 40 moves then away from the contact zone, and the hot melt soaked in the separator material cools down, solidifies and provides an efficient sealing 42 at the central bottom part 39 as shown in FIG. 14. The application of a predetermined amount of hot melt in a uniform area on the separator bottom, which is a neutral area from the point of view of the operation of the cell as there is no active cathode material on the opposing side, and therefore will not cause any interference with cell performance and also not contribute to any added internal resistance. The application of the hot melt is in no way indispensable and represents an optional feature, whereby an increased protection against cell shorts is provided.

Reference will be made again to FIGS. 15 to 17 wherein the insertion of the separator 31 into the hollow cylindrical interior of the console (can/cathode) assembly 35 is illustrated. The manufacturing line is in constant movement, and the separator 31 wrapped around the sleeve 26 and kept in the winding nest 22 (FIGS. 11, 12) leaves the position where the hot melt sealing 42 is provided and moves to a station where the console assembly 35 is moved under the separator 31 so that their vertical axes fall in the same line. The console assembly 35 comprises the cell can 36 with the cathode rings 37 positioned therein. Now the sleeve 26 and the pin 27 are moved down together and the separator 31 is inserted in the hollow interior of the console assembly 35. The wide head portion 28 of the pin 27 pushes the closed bottom part of the separator 31 during the whole path and ensures a perfect abutment with the bottom of the interior of the can 36. The separator 31 slips out of the winding nest 22 when being already inserted partially into the console assembly 35, thus the windings of the separator 31 cannot loosen or get unwrapped. After insertion the separator's winding can stretch out a bit to fill the whole inner space defined by the hollow inner surface of the cathode rings 37.

The next step is the withdrawal of the sleeve 26 in upward direction as shown in FIG. 16. The pin 27 presses the bottom of the separator 31 during this withdrawal step and keeps the separator 31 in position. Finally, the pin 27 is withdrawn, and the semi-finished cell contains the console assembly 35 with the separator 31 duly positioned, and being ready for the next operation on the assembly line, i.e. electrolyte dispensing. The advantage of having a two-part mandrel 23, where the outer sleeve 26 can be retracted first, is that there will be no chance of separator pull-back out of the semi-finished cell, thereby increasing efficiency and yield of the manufacturing process.

This design and assembly of the separator 31 is preferable because the full active length of the cell can be used for cell function. The separator can fill out the interior of the cathode rings, i.e. no gap will be formed, as it is the case in pre-formed separators. Comparative cell measurements have demonstrated that the average performance of cells provided with the separator according to the present invention was by about 10 to 20% better than in case of identical cells with conventional separator. The improvement was measurable in cell capacity and in decrease of the internal cell resistance resulting in higher short circuit currents and better high drain performance.

There will be no need for using any adhesive between adjacent layers of the separator as it is the case in most known designs, and the separator function will not be decreased by the presence of adhesives. A further advantage lies in the elimination for the need of using laminated sheets, which are more expensive than using bare sheets and have slightly worse performance due to the application of an adhesive between the layers.

The manufacturing process is also favorable because it is performed with the speed and machinery of the cell manufacturing line, i.e. the operation of the preparation of the separator can be synchronized with the manufacturing line.

The invention claimed is:

1. A method for making a cylindrical separator for batteries with a hollow cylindrical interior, said cylindrical separator having a cylindrical portion with a given length and a closed bottom part having a required arcuate profile closing an end of said cylindrical portion, comprising the steps of:

providing a sheet separator material of predetermined length and width, wherein the width is at least as long as the length of the cylindrical portion of the separator plus and extended portion that is at least as long as the radius of the separator;

winding said sheet material around a mandrel by rotating said mandrel, wherein said mandrel has a lower end that reaches said end of said cylindrical portion of the separator and a head portion at the lower end shaped to define the required profile of said closed bottom part, wherein said extended portion of said sheet material is wound to form a multi-layered hollow cylinder with an uncut continuous wall projecting out of said head portion of said mandrel, and wherein no binder is applied between the layers in the multi-layered cylinder;

arranging a non-rotating winding nest around the outside of the winding on said rotating mandrel for supporting the winding from the outside;

applying a predetermined amount of water to said projecting hollow cylinder during any of the foregoing steps to soften said sheet material at the extended portion;

guiding said rotating mandrel and separator when placed in said winding nest above and along a stationary rail provided with a forming groove with a profile varying along its length so that said rotating extended portion is engaged in, contacts, and slides along said profile of said groove in a direction normal to the axis of rotation of said mandrel and of said separator, and through a number of revolutions said varying profile gradually conforms to that of said head portion to gradually fold said wetted extended portion from the edge towards the center thereof to form said closed the bottom part;

causing said mandrel and said separator to stop rotation;

drying and fusing said wet closed bottom part by the application of heat and a predetermined pressure; and introducing said separator into the cylindrical cavity of a semi-finished cell from said winding nest by pushing said closed bottom part of the separator by means of axial movement of said mandrel; and withdrawing said mandrel from the interior of said separator.

2. The method as claimed in claim 1, wherein the sheet separator material comprises at least a first sheet material and a second sheet material which are placed on one another and wound during said winding step.

3. The method as claimed in claim 1, wherein said water application step is carried out prior to said winding step.

4. The method as claimed in claim 2, wherein said second sheet material is a semi-permeable membrane.

5. The method as claimed in claim 1, further comprising the step of slightly pressing said rotating separator on said mandrel from the outside by a belt moving with the required peripheral speed of the rotating separator throughout the whole period of rotation.

6. The method as claimed in claim 1, wherein said drying and fusing step is carried out by a heated die shaped to the required profile of said separator bottom part.

7. The method as claimed in claim 1, further comprising the step of applying a thermoplastic sealant of predetermined volume on the central zone of said separator bottom part following said drying and fusing step and prior to said introduction step.

8. The method as claimed in claim 1, wherein said mandrel comprises a sleeve and a pin therein, said head portion being provided on said pin, and said sleeve defining a recess for receiving said head portion.

9. The method as claimed in claim 8, wherein during said withdrawing step said sleeve is withdrawn first followed by withdrawal of said pin.

10. The method as claimed in claim 1, wherein all of said steps are synchronized with a cell manufacturing line.

* * * * *